US008367306B1

(12) United States Patent
Doty et al.

(10) Patent No.: US 8,367,306 B1
(45) Date of Patent: Feb. 5, 2013

(54) METHOD OF CONTINUOUS OR BATCH FABRICATION OF LARGE AREA POLYMER MICRO-TRUSS STRUCTURED MATERIALS

(75) Inventors: Robert E. Doty, Los Angeles, CA (US); Alan J. Jacobsen, Woodland Hills, CA (US); Joanne A. Kolodziejska, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 273 days.

(21) Appl. No.: 12/835,276

(22) Filed: Jul. 13, 2010

Related U.S. Application Data

(60) Provisional application No. 61/225,201, filed on Jul. 13, 2009.

(51) Int. Cl.
  *G03F 1/00* (2012.01)
  *G03B 27/12* (2006.01)
  *G03B 27/30* (2006.01)
(52) U.S. Cl. ............... 430/320; 355/84; 355/95; 355/97
(58) Field of Classification Search ..................... None
  See application file for complete search history.

(56) References Cited

U.S. PATENT DOCUMENTS

| | | | | | |
|---|---|---|---|---|---|
| 4,506,004 | A | * | 3/1985 | Sullivan | ............... 430/312 |
| 4,543,145 | A | * | 9/1985 | Schnell et al. | ............... 156/231 |
| 4,544,626 | A | * | 10/1985 | Sullivan | ............... 430/311 |
| 4,728,539 | A | * | 3/1988 | Gane | ............... 427/356 |
| 5,066,133 | A | * | 11/1991 | Brienza | ............... 359/570 |
| 5,965,329 | A | * | 10/1999 | Sakaki et al. | ............... 430/320 |
| 5,974,974 | A | * | 11/1999 | Agnew et al. | ............... 101/401.1 |
| 6,455,339 | B1 | * | 9/2002 | Wu et al. | ............... 438/30 |
| 6,951,627 | B2 | * | 10/2005 | Li et al. | ............... 264/400 |
| 7,382,959 | B1 | | 6/2008 | Jacobsen | |
| 7,653,279 | B1 | * | 1/2010 | Jacobsen | ............... 385/129 |
| 7,704,644 | B2 | * | 4/2010 | Schneider et al. | ............... 430/1 |

(Continued)

FOREIGN PATENT DOCUMENTS

| | | | |
|---|---|---|---|
| DE | 3339723 | * | 5/1987 |
| DE | 3906070 | * | 9/1990 |

(Continued)

OTHER PUBLICATIONS

Sato et al., "Three diemnsional microstructures consisting of high aspect ratio inclide micro-pillars fabricated by simple photolithography", Microsys. Technol., vol. 10 pp. 440-443 (2004).*
Sato et al., "In-channel 3D micromesh structures using maskless multiangle exposures and their microfilter applications", Sens. Actuat. A., vol. 111 pp. 87-92 (2004).*
Jacobsen et al., "comression behavior of microscale truss strucutres formed from self propogating polymer waveguides", Acta. Mater., vol. 55 pp. 6724-6733 (2007).*

(Continued)

*Primary Examiner* — Martin Angebranndt
(74) *Attorney, Agent, or Firm* — Christie, Parker & Hale, LLP (57) ABSTRACT

A system for forming a plurality of polymer waveguides includes at least one collimated light source adapted to produce a plurality of collimated light beams; a channel having an exposure area for the collimated light beams to pass through and for holding a photo-monomer adapted to polymerize when exposed to the collimated light beams, the photo-monomer moving with respect to the plurality of collimated light beams; and a mask disposed between the at least one collimated light source and the photo-monomer. A method for forming a plurality of polymer waveguides includes moving a mask across an exposure area of a channel containing a photo-monomer; exposing the photo-monomer to collimated light through the exposure area of the channel; growing the plurality of polymer waveguides from the exposure area into the photo-monomer to form an interconnected ordered three-dimensional polymer micro-truss structure; and removing the ordered 3D polymer micro-truss structure from the channel.

26 Claims, 9 Drawing Sheets

U.S. PATENT DOCUMENTS

2006/0062830 A1 * 3/2006 Hayashi et al. ............... 424/443
2009/0162799 A1 * 6/2009 Porque ......................... 430/324

FOREIGN PATENT DOCUMENTS

| EP | 96863 | * 12/1983 |
| JP | 60-205452 | * 10/1985 |
| JP | 07-089008 | * 4/1995 |

OTHER PUBLICATIONS

A. Bertsch, P. Bernhard, and P. Renaud (2001), "Microstereolithography : Concepts and applications", presented at the *8th International IEEE Conference on Emerging Technologies and Factor Automation*, vol. 2, pp. 289-298.

* cited by examiner

METHOD OF CONTINUOUS OR BATCH FABRICATION OF LARGE AREA POLYMER MICRO-TRUSS STRUCTURED MATERIALS

CROSS-REFERENCE TO RELATED APPLICATIONS

This application claims priority to and the benefit of U.S. Patent Application No. 61/225,201, filed on Jul. 13, 2009, entitled "Method of Continuous or Batch Fabrication of Large Area Polymer Micro-Truss Structured Materials," the entire content of which is incorporated herein by reference.

FIELD

Embodiments of present invention relate to a method and/or system for continuous or batch fabrication of large area polymer micro-truss structured materials.

BACKGROUND

Micro-truss structured material is a polymer cellular material that can be used as is, or as a template to form other materials with ordered 3D micro-truss structures, such as metals or ceramics. Micro-truss materials are useful for a number of applications such as in lightweight structural materials; energy absorbing materials; heat transfer applications; deployable structures (space structures); conformable core structures; acoustic damping; hook and loop attachments; compliant structures; optics for sub-micron waveguide formation; single body casting/net shape manufacturing; alternate shapes for waveguide members (3D honeycomb); functionally graded structures; heat exchanger/insulator structures; 3D battery/fuel cell structures; thermal switch structures; catalyst support structures; filtration/separation structures; wicking materials/moisture control structures; directional optical coupler/flexible display structures; distributed lighting structures; electrical interconnects; sensor supports with high surface areas; biological growth templates; flexible body/reactive armors; stealth coatings; high friction/high wear surfaces; waveguides for other energy sources; flame retardant foams; etc.

U.S. Pat. No. 7,382,959, which is incorporated by reference herein in its entirety, describes a method and system of creating one or more waveguides and/or patterning the waveguides to form a three-dimensional (3D) ordered polymer micro-truss structure. The system includes one or more collimated light sources, a reservoir/mold having (or containing) photo-monomer that will polymerize at a wavelength of collimated light beams provided by the light sources, and a patterning apparatus, such as a mask with multiple apertures (open areas).

After formation of the micro-truss structure according to the above-described system and method, the polymer waveguides are still somewhat soft, so there is a tendency for the micro-truss structure to sag or collapse during post-exposure processing steps. Such distortions can largely be prevented if the nodes at the bottom surface of the micro-truss structure are also attached to a solid substrate. In a refinement of the system and method, when the polymer waveguides reach the bottom of the reservoir, they are attached to a second substrate that is placed in the mold prior to filling the reservoir with photo-monomer. The excess photo-monomer is then drained from the mold and the micro-truss structure is removed, along with the attached top and bottom substrates, for cleaning and further processing. After the micro-truss structure is cleaned, a thermal post-cure process leaves the micro-truss stiff enough to be self-supporting and the substrates can be removed.

In the above-described system and method, there is a fixed, inflexible relationship between the principal elements of the fabrication process—the mask, substrate, mold and micro-truss structure. Because the micro-truss structure is inseparable from the mask and substrates until the end of processing, the mask, substrate and mold must have the same dimensions as the finished structure.

Many projected applications of the micro-truss structured material require large area sheets or panels in order to take advantage of the unique properties of the micro-truss. Examples include structural panels for aircraft and lightweight body armor. Fabricating larger-area micro-truss structures using the system and method described above requires larger masks, substrates and molds as well as collimated light sources having larger exposure areas, which are more costly and difficult to manufacture and handle. Thus, there is a need for a system and method of creating large area polymer micro-truss structures on a scale that makes the technology useful in a wide range of applications, and economically viable for commercial manufacture.

SUMMARY

Aspects of embodiments of the present invention are directed toward a method and/or system of continuous or batch fabrication of large area polymer micro-truss materials. According to one embodiment of the present invention, a mask is positioned at the bottom of a channel containing photo-monomer and above a light source, and the light source is used to cure polymer optical waveguides in an exposure area of the channel. In one embodiment, during exposure, the polymer waveguides grow upward and self-propagate in a 3D pattern until they reach the surface of the photo-monomer to form a micro-truss structure. After formation of the micro-truss structure, the micro-truss is removed from the mask and conveyed downstream for further processing.

In an embodiment of the method, the mask is moved with the photo-monomer past a light source to continuously form a plurality of polymer waveguides. The formed plurality of polymer waveguides move with the mask and the photo-monomer across the exposure area of the channel. The resulting micro-truss structure can then be removed from the mask and transferred to a conveyor belt for further processing while the mask is looped back through the channel to continue forming micro-truss structures. In some embodiments, the photo-monomer and the polymer waveguides are moved through the channel by a substrate (e.g., a PET film). In embodiments where the mask is positioned at the bottom of the channel, the supporting substrate is transparent. In other embodiments, where the mask is located above the channel or on either side of the channel, the substrate does not need to be transparent.

In one embodiment, a system for forming a plurality of polymer waveguides includes at least one collimated light source adapted to produce a plurality of collimated light beams; a channel with an exposure area for the collimated light beams to pass through and for holding photo-monomer adapted to polymerize when exposed to the collimated light beams; and a mask disposed between the at least one collimated light source and the photo-monomer. The mask extends along a plane and has at least one aperture adapted to guide a first beam, a second beam and a third beam of the collimated light beams into the photo-monomer to respectively form and grow a first polymer waveguide, a second polymer waveguide and a third polymer waveguide of a plurality of polymer waveguides in a portion of the photo-monomer, wherein the mask is configured to move with the photo-monomer and the polymer waveguides in a first direction across the exposure area, and the system is configured to grow the plurality of polymer waveguides to form a micro-truss structure having a length in the first direction that is independent of the size of the exposure area.

In another embodiment, a method for forming a micro-truss structure includes moving a mask and photo-monomer in a first direction across an exposure area of a channel; exposing the photo-monomer to collimated light through the mask in the exposure area of the channel; growing a plurality of polymer waveguides into the photo-monomer to form the micro-truss structure having a length in the first direction independent of a size of the exposure area; and conveying the ordered 3D polymer micro-truss structure from the channel.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

An aspect of an embodiment of the present invention provides a method and/or system of continuous or batch fabrication of large area ordered 3D micro-truss structures. According to one embodiment of the present invention, a mask is positioned at the bottom of a channel and above a light source, and the light source is used to cure polymer optical waveguides. In one embodiment, during exposure, the polymer waveguides grow upward and self-propagate in a 3D pattern until they reach the surface of the photo-monomer to form a micro-truss structure. After formation of the micro-truss structure, the micro-truss is removed from the mask and conveyed downstream for further processing.

In an embodiment of the method, the mask is moved with the photo-monomer past a light source to continuously form a plurality of polymer waveguides which also moves with the mask. The resulting micro-truss structure can then be removed or separated from the mask and transferred to a conveyor belt for further processing while the mask is looped back through the channel to continue forming micro-truss structures.

Figure 1:
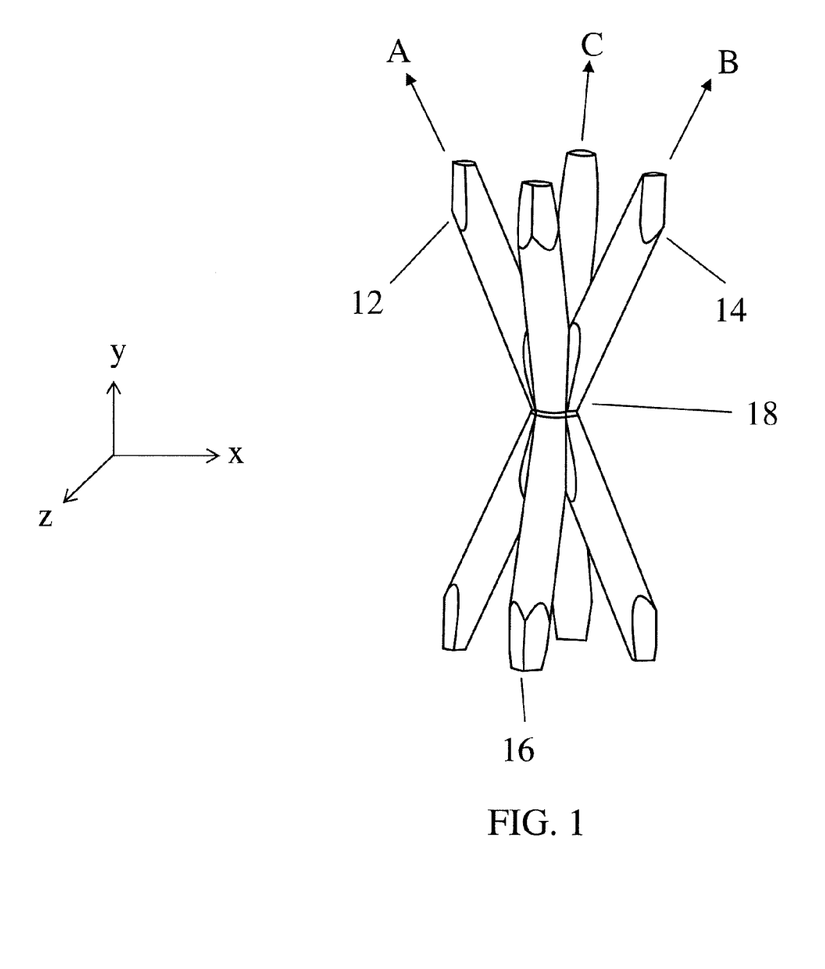
FIG. 1 is a perspective view of a portion of an ordered 3D micro-truss structure according to aspects of the present invention.
Figure 2:
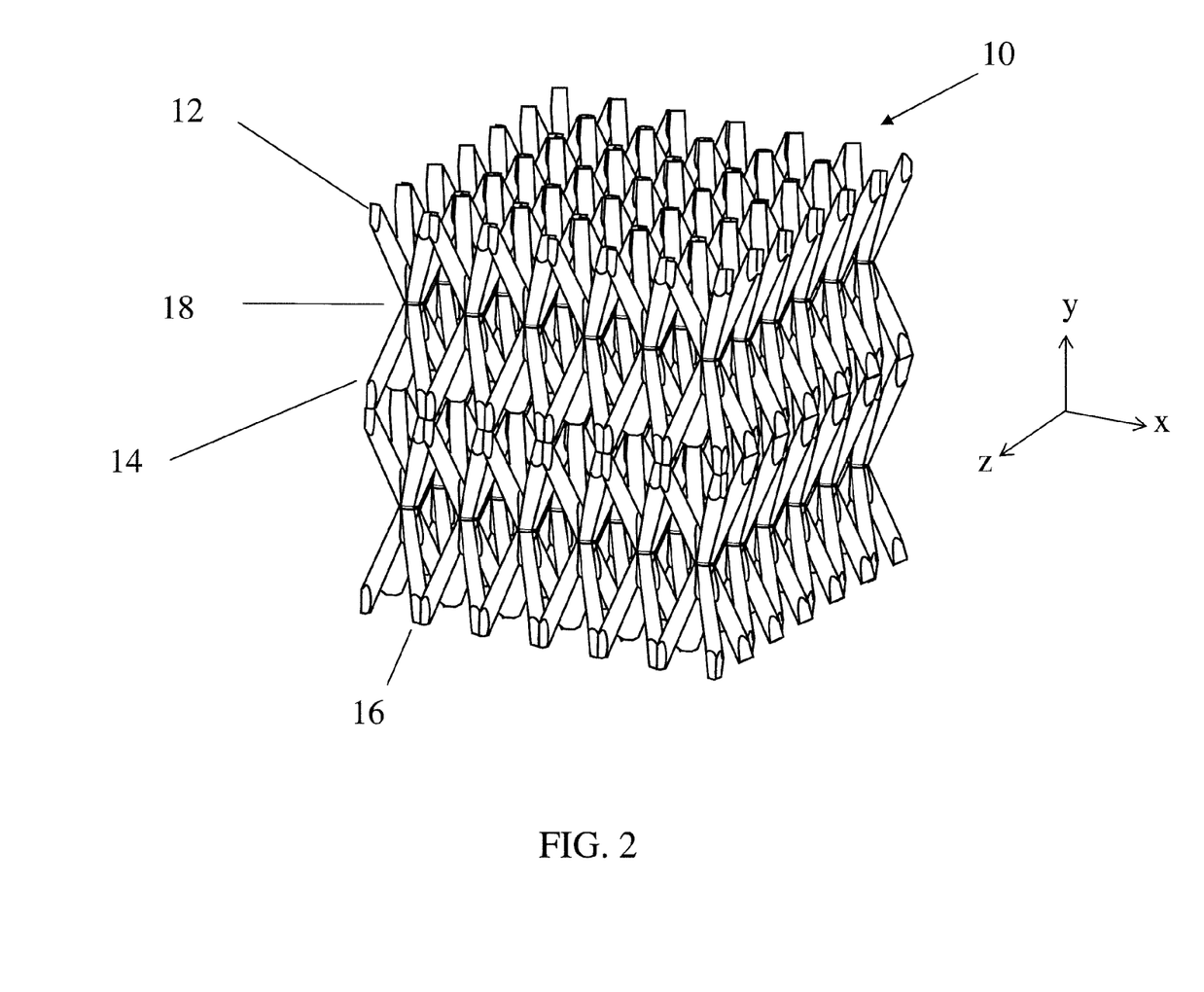
FIG. 2 is a perspective view of an ordered 3D micro-truss structure according to aspects of the present invention.

Referring to FIGS. 1 and 2, an ordered 3D open-cell micro-truss structure 10 that can be made according to an embodiment of the present invention is a self-supporting structure. This ordered 3D open-cell micro-truss structure 10 can be utilized or modified for use in a micro-truss based composite armor and/or to manufacture the micro-truss based composite armor. The ordered 3D open-cell micro-truss structure 10 includes first micro-truss elements 12, second micro-truss elements 14, and third micro-truss elements 16. The first micro-truss elements 12 are defined by first self-propagating polymer waveguides and extend along a first direction A. The second micro-truss elements 14 are defined by second self-propagating polymer waveguides and extend along a second direction B. The third micro-truss elements 16 are defined by third self-propagating polymer waveguides and extend along a third direction C. With reference to FIGS. 1 and 2, the micro-truss elements 12, 14, and 16 interpenetrate each other at nodes 18 to form a continuous material with an ordered 3D micro-truss structure. These nodes are generally unperturbed by changes in index of refraction caused by photopolymerization due to their formation as described in more detail below with respect to FIG. 5.

The micro-truss elements 12, 14, and 16 may include a photo-polymer material. The micro-truss elements 12, 14, and 16 may be polymer optical waveguide micro-truss elements.

The continuous material may be continuously formed such that it lacks any interior boundaries, e.g., boundaries within the interpenetrating portions of micro-truss elements 12, 14, and 16. Each node 18 of the micro-truss structure 10 may be formed of the continuous material.

A light input (collimated ultraviolet light) may be used to cure (polymerize) polymer optical waveguides to form the micro-truss structure 10, which can self-propagate in a 3D pattern. The light input may be fixed in size and may be fixed in location (or stationary with respect to the 25 mask). As such, the propagated polymer optical waveguides form the micro-truss structure 10.

As disclosed in Monro et al. "Topical Review Catching Light In Its Own Trap," Journal Of Modern Optics, 2001, Vol. 48, No. 2, 191-238, which is incorporated by reference herein in its entirety, some liquid monomers, referred to as photo-monomers, undergo a refractive index change during the polymerization process. The refractive index change can lead to the formation of polymer optical waveguides. If a photo-monomer that is photo-sensitive is exposed to light (typically ultraviolet) under the right conditions, the initial area of polymerization, such as a small circular area, will "trap" the light and guide it to the tip of the polymerized region, further advancing that polymerized region. This process will continue, leading to the formation of a waveguide structure with approximately the same cross-sectional dimensions along its entire length. Here, the length of the micro-truss elements is limited by the intensity of the light and the nature and/or material characteristics of the photo-monomer.

According to one embodiment of the present invention, a moving mask with a two-dimensional pattern of apertures 340 (see FIGS. 4a, and 4b) is used with a light source and photo-monomer to create an ordered 3D polymer micro-truss structure (or an open-cell polymer micro-truss structure).

Figure 3A:
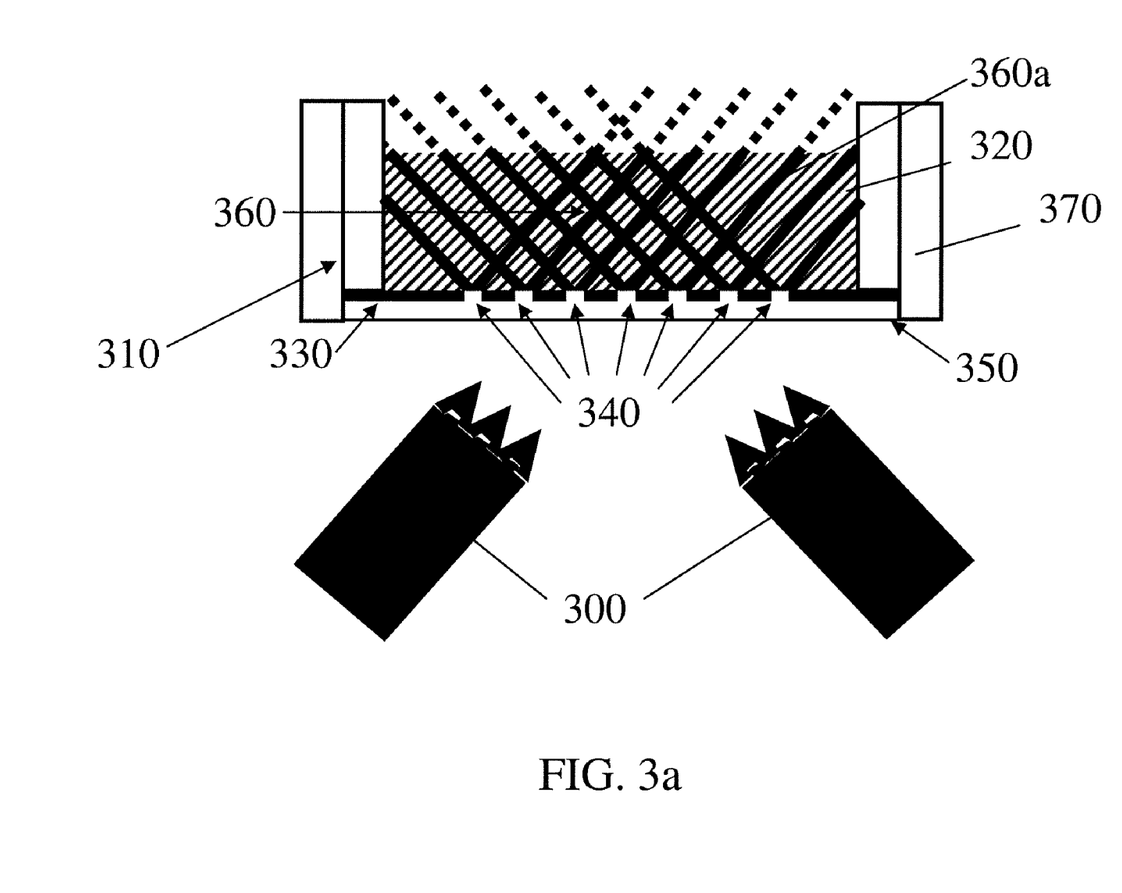
FIG. 3a is a schematic cross-sectional diagram at an exposure area of a channel of a system for forming a structure from multiple waveguides created using a single collimated beam or multiple collimated beams passing through multiple apertures located at the bottom of the channel.

FIG. 3a is a schematic cross-sectional diagram of a continuous process for forming a structure of unlimited length from multiple waveguides created using a single collimated beam or multiple collimated beams passing through multiple apertures located at the bottom of the channel. With reference to FIG. 3a, a system for forming an ordered 3D polymer micro-truss structure according to an embodiment of the present invention includes one or more collimated light sources 300, a channel/mold 310 having (or containing) photo-monomer 320 that will polymerize at a wavelength of collimated light beams provided by the light sources 300, and a patterning apparatus, such as a mask 330 with one or more apertures (open areas) 340. Each of the apertures 340 has a given shape and dimension substantially matching a cross-sectional geometry of a waveguide (e.g. waveguide 360a).

Continuing with FIG. 3a, the mask 330 rests, without attachment, on the transparent substrate (or transparent plate) 350 that includes the bottom of the channel/mold 310. In one embodiment, the mask 330 is made of a lightweight, flexible, and opaque material such as PET (polyethylene terephthalate) film. The transparent substrate 350 may be made of a material (such as quartz) that is transparent to the light emitted from the collimated light sources, such that the collimated light shines into an exposure area 410 of the channel (see, e.g., FIG. 4c). The photo-monomer 320 fills the channel 310 above the mask 330, and the weight of the photo-monomer 320 prevents or protects the mask 330 from bowing. In one embodiment, different thicknesses of micro-truss structures can be achieved by filling the channel (or mold) 310 with photo-monomer 320 to the desired height. Once the collimated light source is applied, the intersecting polymer waveguides 360a will grow upward from the surface of the mask 330, terminating at the free (e.g., upper) surface of the photo-monomer 320 in the channel 310. The mask 330 is configured to move in the channel 310 (e.g., out of the plane of FIG. 3a) to move the apertures 340, the photo-monomer 320, and the growing waveguides 360a through the exposure area.

Figure 4A:
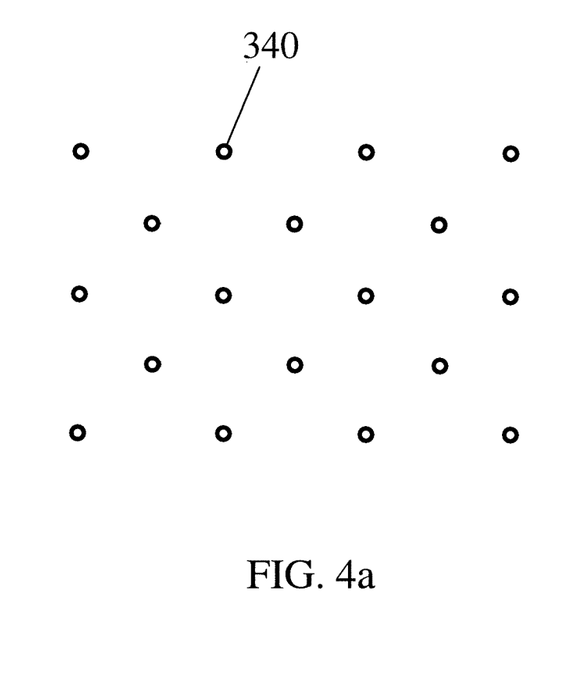
FIG. 4a illustrates a square mask pattern (or a square mask aperture pattern) according to an embodiment of the present invention.
Figure 4B:
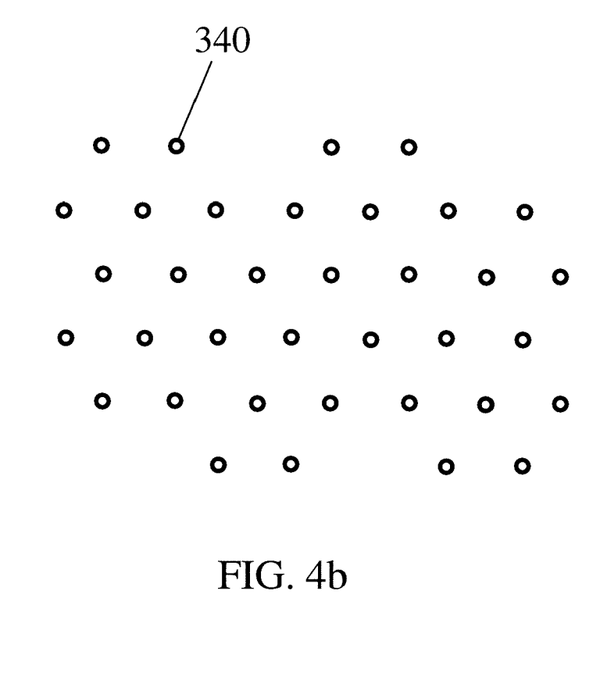
FIG. 4b illustrates a hexagonal mask pattern (or a hexagonal mask aperture pattern) according to an embodiment of the present invention.

Here, in FIG. 3a, a 3D network (or micro-truss structure 360) can be formed because the intersecting polymer waveguides 360a will polymerize together, but will not interfere with waveguide propagation. Also, the spacing between the plurality of waveguides 360a corresponds with the pattern of the plurality of apertures 340. The pattern of the apertures 340 may, for example, be in a square pattern as shown in FIG. 4a and/or in a hexagonal pattern as shown in FIG. 4b. The hole (aperture) spacing, i.e., distance between apertures 340 in the mask 330, and the number of waveguides 360 formed from each of the apertures 340 will determine the open volume fraction (i.e. open space) of the formed ordered 3D micro-truss structure (or the formed open-cell polymer micro-truss structure).

As such, using the system of FIG. 3a, an ordered 3D micro-truss structure 360 can be designed for various applications. The design parameters include: 1) the angle and pattern of the polymer waveguides with respect to one another, 2) the packing, or relative density of the resulting cell structure (or the open volume fraction), and 3) the cross-sectional shape and dimensions of the polymer waveguides. Here, in one embodiment, the waveguide (or micro-truss) diameter can range from 10 microns to 5 mm depending on the design criteria. The length of the waveguide between waveguide nodes of interpenetrating waveguides can be between 5 and 15 times the diameter. In addition, the number of nodes, or the number of repeating unit cells, through the thickness of the 3D micro-truss structure can be designed. A typical micro-truss structure can have ½ unit cell to 5 unit cells through its thickness. Moreover in an embodiment of the present invention illustrated in FIG. 5, the propagation distances and the size of the nodes of the interpenetrating waveguides are unperturbed by the change in the index of refraction caused by polymerization, due to the method of formation of the ordered 3D micro-truss structure (or the open-cell polymer micro-truss structure).

Figure 4C:
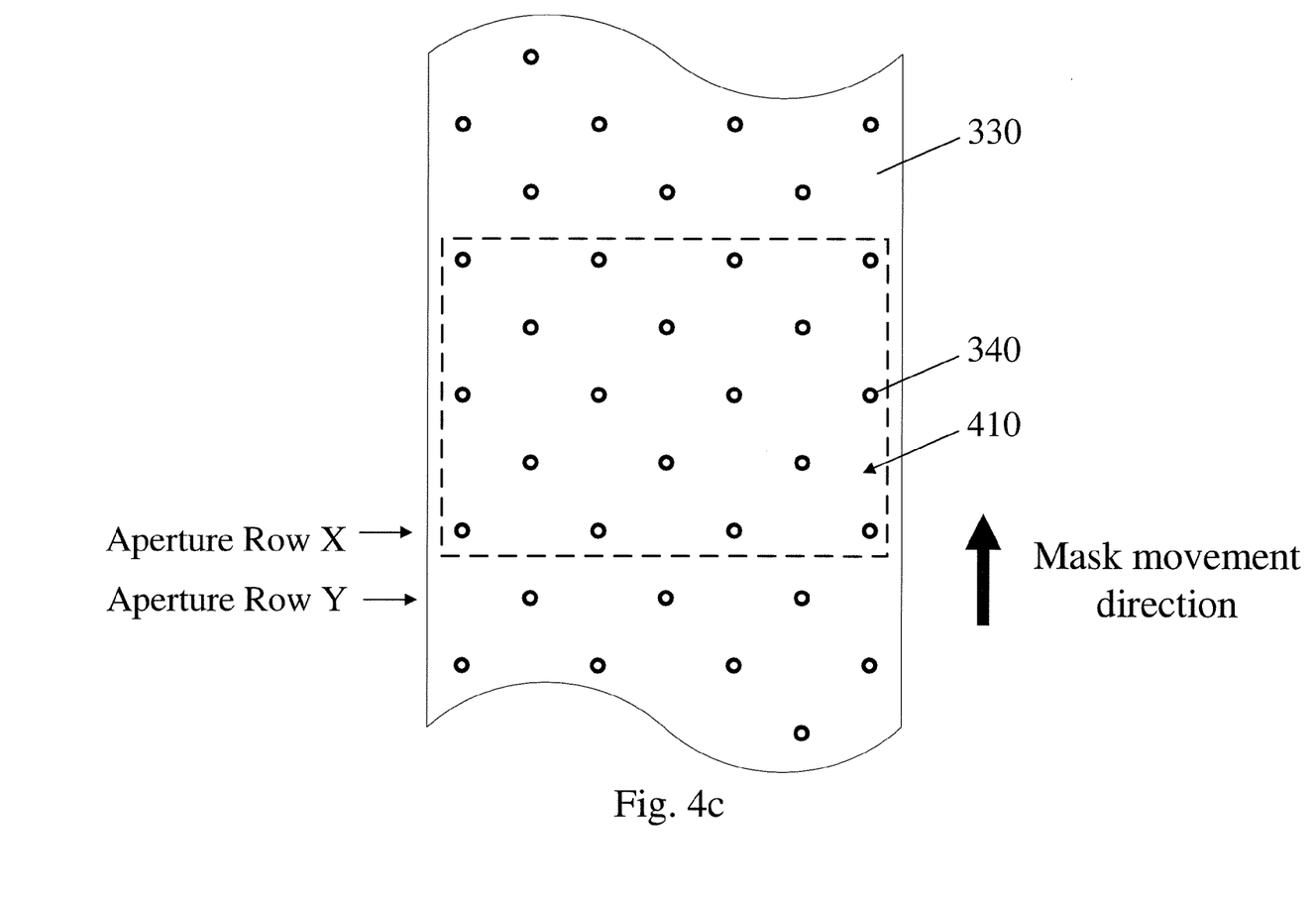
FIG. 4c illustrates the movement path of a mask pattern across an exposure area of the channel according to an embodiment of the present invention.
Figure 5:
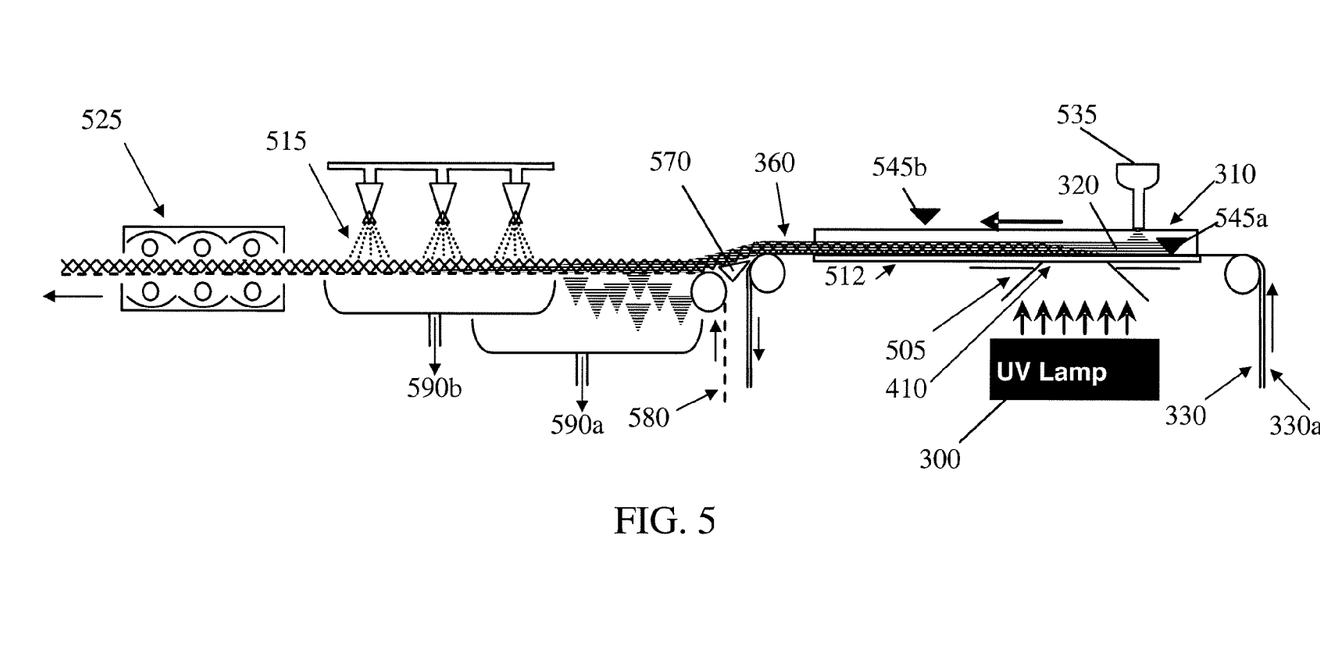
FIG. 5 is a schematic representation of a system for forming an ordered 3D micro-truss structure according to an embodiment of the present invention from multiple waveguides created using a single collimated beam or multiple collimated beams through multiple apertures and a moving mask.

With reference to FIG. 5, a system for forming a large area polymer micro-truss structure according to an embodiment of the present invention includes one or more collimated light sources 300 (for example and without implying a limitation, a UV collimated light source), a reservoir/mold channel (or a channel reservoir) 310 having open ends, and a mask 330 formed into a continuous loop. In one embodiment the light source 300 is combined with a mirror array 505 to direct light at controlled angles upward through the bottom of the mold channel 310 into an exposure area 410 (see, e.g., FIG. 4c). In some embodiments, the bottom of the mold channel 310 is a transparent material 512, such as quartz, which supports and provides a flat surface for the mask loop. In one embodiment, the sides of the mold channel 310 are made of an opaque material such as aluminum or polytetrafluoroethylene (PTFE). In one embodiment the mask 330 is made of a thin, lightweight, flexible film such as PET film, with a pattern printed on it. In some embodiments the mask 330 is 5 to 10 mil (i.e., 0.005 to 0.010 inches) thick. In one embodiment the mask 330 is coated with an opaque material containing an array of apertures transparent to the wavelength of the collimated light sources 300.

Continuing with FIG. 5, in some embodiments the mask 330 is a continuous loop which is propelled on rollers around a circuit. In one embodiment a dispenser 535 dispenses pre-mixed photo-monomer 320 onto the moving mask 330 at a controlled rate. The moving mask 330 carries the photo-monomer 320 across the exposure area 410 (in FIG. 4c) such that collimated light is applied continuously to the same parts of the growing polymer waveguides (e.g., 360a) and the photo-monomer 320 as it crosses the exposure area 410 to form the micro-truss structure 360. The depth of the photo-monomer 320 in the mold channel 310 can be controlled so that polymerized waveguides join to form a node at the top surface of the photo-monomer 320 in the mold channel 310. The beams of light from light sources 300 pass through the mask 330 to create a pattern of self-propagating, intersecting polymer waveguides that form an interconnected ordered 3D micro-truss structure 360 attached to the mask 330. Referring to FIG. 4c, the speed at which the moving mask 330 moves is selected such that the polymer waveguides are fully formed when the polymer waveguides exit the exposure area 410

(e.g., at the top of FIG. 4c). The speed of the moving mask 330 and the distance between the apertures 340 in a direction parallel with the direction of movement are designed or chosen such that the more fully polymerized waveguides corresponding to the apertures 340 in row X do not interfere with the polymerization of the less fully polymerized waveguides corresponding to apertures 340 in row Y. The limitations on the speed at which the mask 330 moves and the spacing of the apertures 340 may depend on the intensity of the light and the characteristics of the polymerization of the photo-monomer 320 being used.

In some embodiments, the micro-truss structure 360 is only weakly attached to the mask 330.

In another aspect of an embodiment, the system includes a removal device 570 at a point after the mold channel 310. For example, in FIG. 5 a knife-edged plate (or a plate having a sharp edge) 570 removes the newly-formed micro-truss structure 360 from the mask 330 at the point where the mask 330 makes a sharp turn. In one embodiment the micro-truss 360 is then transferred onto a porous conveyor belt 580 that supports and moves the micro-truss structure 360 downstream while draining away excess photo-monomer 320 into a basin 590a. In one embodiment the porous conveyor belt 580 is a perforated PET film substrate loop.

According to another embodiment of the present invention, the system includes a solvent that can be applied to the micro-truss structure 360 by any suitable means such as a spray 515 or a bath to clean the micro-truss structure 360. In one embodiment the waste solvent is collected in a basin 590b and recycled.

In one embodiment the system includes an ultraviolet curing oven 525 that uses high-intensity ultraviolet light and elevated temperatures to dry and post-cure the micro-truss structure 360.

According to another embodiment of the present invention, the system shown in FIG. 5 can be used to produce batches of micro-truss materials. In some embodiments the photo-monomer 320 is initially contained in the channel 310 by two flexible, squeegee-like dams 545a and 545b that are arranged to define a reservoir above the exposure area 410. In some embodiments the dams 545a and 545b are retractable to allow the formed micro-truss structure 360 to move downstream from the exposure area 410 (i.e., an area through which the photo-monomer 320 and the polymerized waveguides are exposed to the collimated beams). In this embodiment, after the micro-truss is formed within the mold/channel 310, dam 545b is lifted and the mask 330 is advanced until the micro-truss is at a point beyond the dam 545b. Dam 545b is then lowered and the reservoir is re-filled with photo-monomer 320; the process is repeated. The micro-truss structure 360 can thus be formed in batches. The steps following the exposure process are the same (or substantially the same) as for the continuous fabrication method described below with respect to FIG. 6.

According to some embodiments of both the continuous and batch processes, a clear or transparent (to the wavelength of the collimated lights 300) film substrate 330a such as PET is placed between the mask 330 and the photo-monomer 320. This transparent film substrate 330a moves in tandem with the mask 330 containing the mask pattern by, for example, the use of a film transport mechanism in which sprocket wheels engage registered perforations in the edges of the mask film 330 and the transparent film substrate 330a. In these embodiments, the transparent film substrate 330a would be the substrate from which the polymer waveguides grow, and the mask 330 would be spared the wear-and-tear resulting from the repeated removal of the micro-truss (e.g. by scraping with the knife-edged plate 570) and cleaning cycles (exposure to solvents, wiping, etc.). In some embodiments, the micro-truss is removed from this transparent film substrate 330a at the knife-edged plate 570 shown in FIG. 5, and in other embodiments it remains attached through the remainder of the cleaning and drying steps. In embodiments in which the micro-truss remains attached to the clear transparent film substrate 330a during the cleaning and drying steps, the clear transparent film substrate 330a, together with the attached micro-truss, may be rotated (e.g., by 90 to 180 degrees) and the orientation of the solvent spray heads (515) adjusted accordingly in order to improve the draining and cleaning of the micro-truss.

In some embodiments, the collimated light sources 300 and the mask 330 may be located above the channel (see, e.g., FIG. 3b) or at either side 370 of the channel (see FIG. 3a). In these embodiments, the exposure area 410 would still be bound by the collimated light sources 300 and the mask 330. In some embodiments, the photo-monomer 320 would be supported by a film substrate 330a such as PET placed between the photo-monomer 320 and the bottom of the channel. The film substrate 330a moves in tandem with the mask 330 in order to move the photo-monomer 320 across the exposure area 410.

Figure 6:
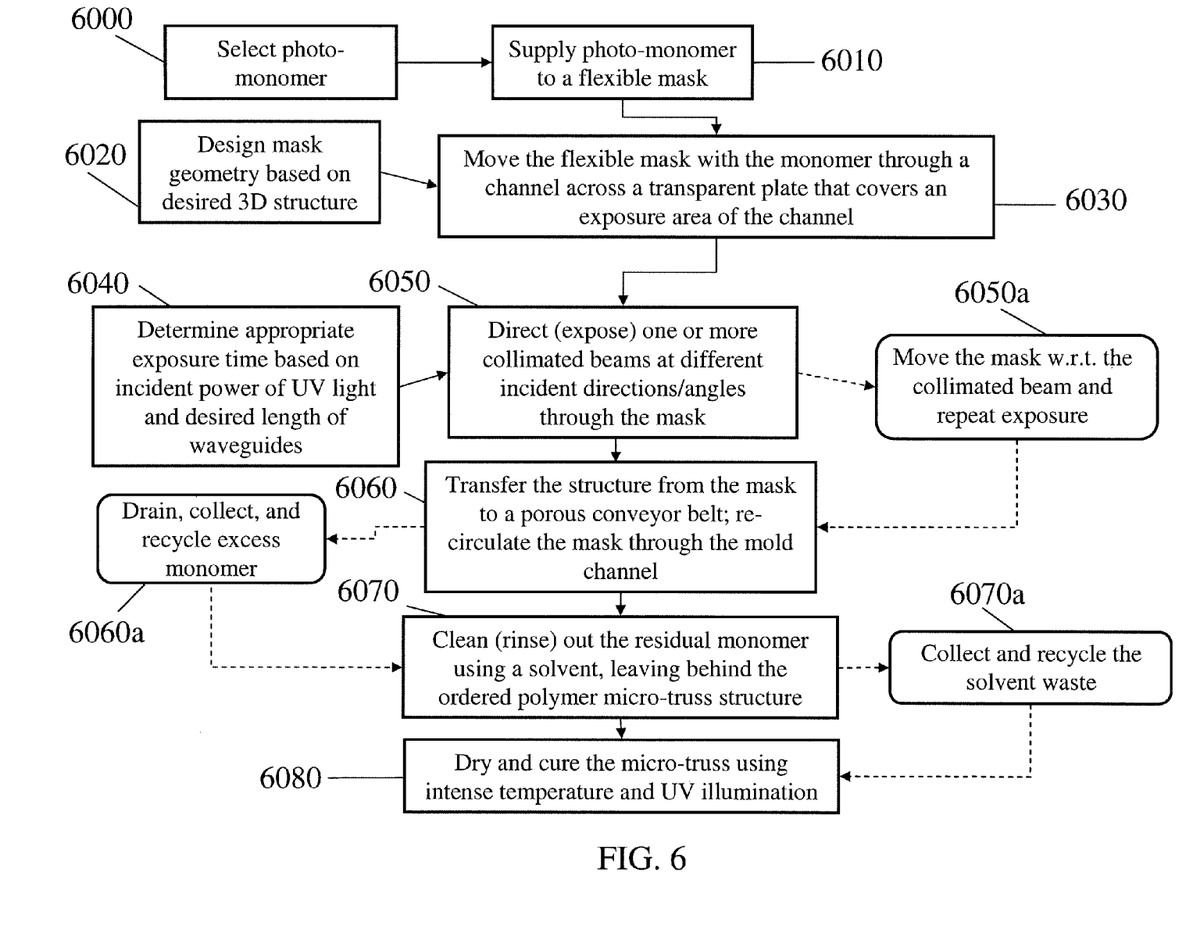
FIG. 6 is a flowchart illustrating a method for forming one or more polymer waveguides of a structure according to an embodiment of the present invention.

In more detail, FIG. 6 shows a method of forming a large area polymer micro-truss structure according to an embodiment of the present invention. As illustrated in FIG. 6, a photo-monomer is selected (6000). The selected photo-monomer is supplied to a patterning apparatus (6010). A mask geometry is designed based on a desired 3D micro-truss structure (6020). The patterning apparatus, such as a flexible mask 330 having the designed geometry, is moved with the photo-monomer through the mold/channel across a transparent substrate 350 that covers the exposure area (6030). The mask 330 has at least one aperture between at least one collimated light source and the selected photo-monomer.

Figure 3B:
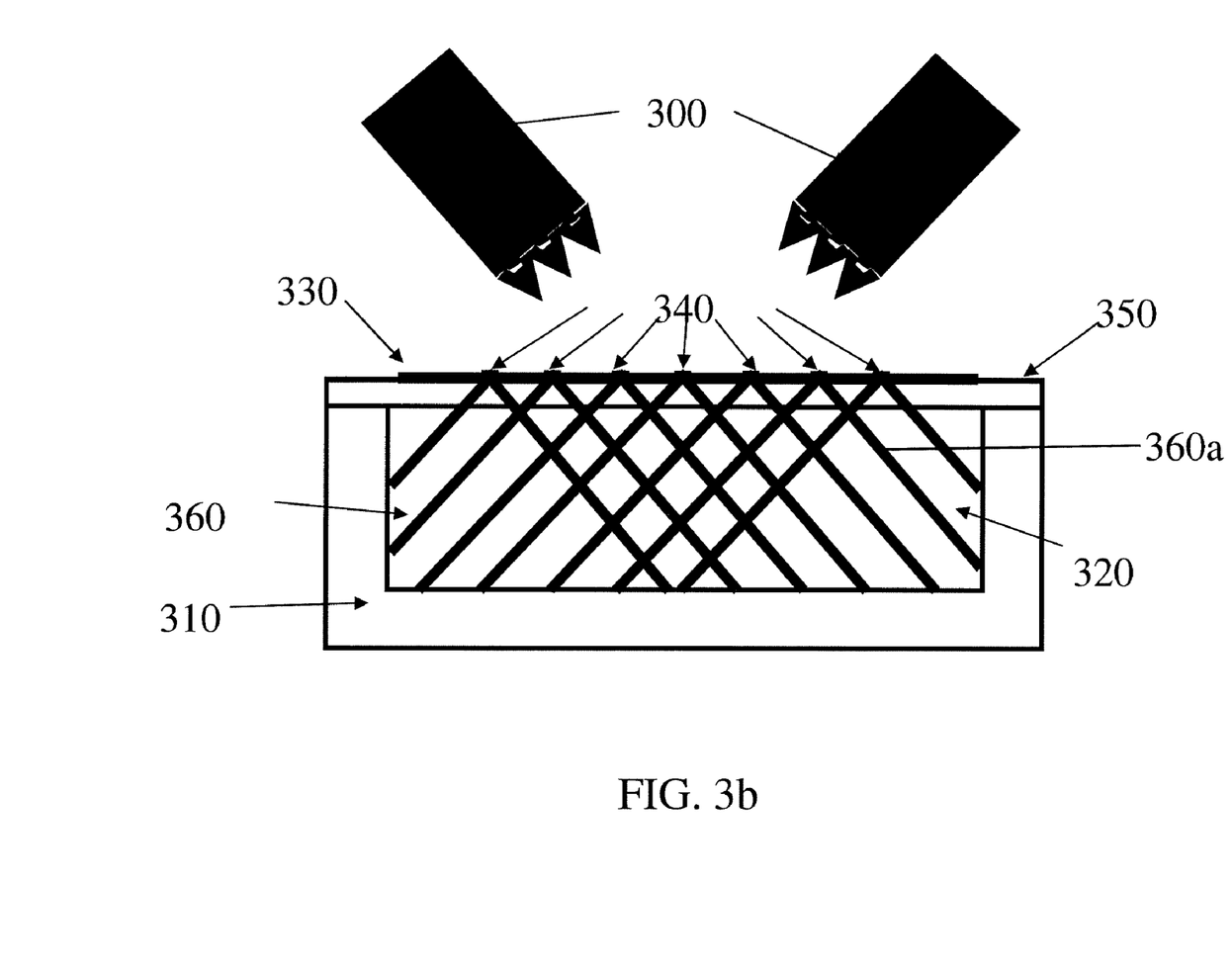
FIG. 3b is a schematic cross-sectional diagram at an exposure area of a channel of a system similar to that of FIG. 3a, but where the collimated beam or beams pass through multiple apertures located above the channel.

Referring, for example, to FIG. 3b, in some embodiments, at least one digital mask may be used in place of the mask 330 below, above, or to either side of the channel 370, or in any combination of these locations between the collimated light sources and the photo-monomer 320. A digital mask is a display device which can be controlled to become opaque at some locations and transparent at other locations to the wavelength of light used to polymerize the photo-monomer, such as a liquid crystal display (LCD). One such liquid crystal display mask is disclosed in A. Bertsch, P. Bernhard, and P. Renaud, (2001) "Microstereolithography: Concepts and applications", paper presented at the 8th International IEEE Conference on Emerging Technologies and Factory Automation, Vol. 2, pp. 289-99, the entire disclosure of which is incorporated herein by reference. In these embodiments, a PET film substrate 330a would be used as the substrate supporting the polymer waveguides, and this film substrate 330a would be transparent at the wavelengths of the light configured to be emitted by the collimated light sources 300 and used to induce polymerization in the photo-monomer, at least in embodiments in which the digital mask and the collimated light sources 300 are located below the channel 310. In embodiments where the collimated light sources 300 are located below the channel, the display device is located between the collimated light sources 300 and the PET film substrate 330a. That is, the display device is stationary with respect to the photo-monomer and may be configured to digitally form a mask having transparent apertures which move with (or track) the photo-monomer 320 and the growing polymer waveguides as they move across the exposure area 410 of the channel 310. Additionally, the digital display can be configured on-the-fly to display any variation of aperture sizes and patterns to produce the desired micro-truss structure 360, eliminating the need for stopping fabrication to change masks.

In some embodiments, at least one flexible transparent organic light emitting diode (OLED) display may be used in place of the mask 330 in a manner similar to the one described above. A flexible transparent organic light emitting diode display mask is not rigid and may be incorporated onto (or fed through) rollers (see FIG. 5) along with the substrate film 330a.

An appropriate exposure time is determined based on properties of the photo-monomer 320 and optics (6040). The collimated light beam from the collimated light source is directed to the mask 330 for a period of exposure time so that a portion of the collimated beam passes through the mask 330 and is guided by the at least one aperture into the photo-monomer 320 to form at least one waveguide 360a through a portion of the photo-monomer 320. Here, the at least one waveguide 360a has a cross-sectional shape substantially matching the designed shape of the apertures 340 on the mask 330. For example, the apertures may be circular, oval, or polygonal in shape.

In one embodiment, one or more collimated beams at different incident directions and/or angles are directed through the mask 330 for a given amount of time (6050). The mask 330, micro-truss structure 360 and/or photo-monomer 320 are moved, either continuously or at discrete intervals (e.g., in a batch mode of operation), with respect to the collimated light beam through the mold/channel 310. In a batch mode of operation, the mask may be moved with respect to the collimated beams emitted by the collimated light sources 300 before the exposure is repeated with the next batch of photo-monomer (6050a).

After the polymer waveguides have formed into an interconnected ordered 3D polymer micro-truss structure 360, the structure is transferred from the mask 330 to a porous conveyor belt 580 (6060). The mask 330 can be pre-treated with a release agent that will allow the waveguides to form and grow on the mask 330 during exposure to light, yet separate easily from the mask 330 after exposure. The porous conveyor belt 580 allows the structure 360 to be drained, cleaned, and post-cured while the mask 330 is re-circulated through the mold/channel 310. As the structure is moved downstream by the conveyor belt 580, the excess photo-monomer 320 is drained away through the pores in, the porous conveyor belt 580. In one embodiment, because only 15-20% of the photo-monomer 320 is polymerized to create the micro-truss structure 360, the excess photo-monomer 320 can be collected and recycled 590a to reduce chemical waste disposal and to lower manufacturing cost (6060a).

Next, any residual traces of photo-monomer 320 still coating the waveguides 360a in the micro-truss structure 360 are removed, for example, by washing the structure 360 with a solvent 515 (6070) to leave behind a cleaned micro-truss structure 360. In one embodiment, the micro-truss structure 360 can be cleaned of residual photo-monomer 320 by, for example, spraying it with a solvent 515 or by passing it through a solvent bath. The waste solvent 590b containing the dissolved photo-monomer 320 can be collected and processed (6070a) using any commercially available solvent recycling system.

After cleaning, the micro-truss structure 360 is dried and cured (6080) by, for example, passing the structure through an ultraviolet curing oven 525 where high-intensity ultraviolet light and elevated temperature are applied to dry and cure the structure in a matter of minutes.

Finally, the sheet of cured polymer micro-truss material 360 leaves the conveyor belt for trimming to size.

Referring back to FIGS. 1 and 2, the micro-truss elements 12, 14, and 16 of the formed micro-truss structure 10 define an open volume (i.e. free space) of the micro-truss structure 10. The micro-truss structure 10 may define a free space of not less than about 40% by volume and not greater than about 99% by volume. Alternatively, the micro-truss structure 10 may define a free space of not less than about 70% by volume and not greater than about 95% by volume.

The micro-truss elements 12, 14, and 16 intersect at the nodes 18 to form symmetrical angles in three dimensions (three orthogonal directions). The symmetrical angles relative to the xz-plane (see, FIG. 1), can measure between 0° and 90°. That is, micro-truss elements 12, 14, and 16 interpenetrate each other to form "perfect" (i.e., unperturbed) nodes: each of the micro-truss elements 12, 14, and 16 defines an angle relative to a compression surface of the micro-truss structure 10 (e.g. a surface parallel to the xz-plane of FIGS. 1 and 2), and the respective angles defined by the micro-truss elements 12, 14, and 16 are substantially equal to one another. That is, these nodes are generally unperturbed by changes in the index of refraction caused by photopolymerization due to their formation as described with respect to FIG. 6.

The micro-truss elements 12, 14, and 16 have an intrinsically high strength due to their small scale. For example, each of the micro-truss elements 12, 14, and 16 may have an axial diameter of less than about 500 μm or less than about 200 μm. Alternatively, each of the micro-truss elements 12, 14, and 16 may have an axial diameter of less than about 1 μm. The micro-truss elements 12, 14, and 16 are configured to have a correspondingly small aspect ratio (e.g., length/diameter ratio) for withstanding a bending moment. Here, each of the micro-truss elements 12, 14, and 16 may have a length less than 100 μm such that the micro-truss elements can better withstand a mechanical load applied to the micro-truss structure 10. As such, the micro-truss elements 12, 14, and 16 experience little, if any, bending deformation during application of the mechanical load to the micro-truss structure 10.

At certain size scales (e.g., the size scales described above), the strength of the micro-truss elements can be increased, which corresponds to an increased strength of the micro-truss structure 10. Each of the micro-truss elements 12, 14, and 16 may have a molecular alignment extending along an axial direction of the micro-truss element. As such, an anisotropic material is produced, which provides a substantial degree of stiffness and/or strength along the axial direction. In a material that is composed of long molecular chains (e.g., polymers), the molecules thereof can be aligned along a direction to provide an increased degree of mechanical strength and/or stiffness along the alignment direction. In more detail, where the molecular alignments of the micro-truss elements 12, 14, and 16 extend along the corresponding axial directions, the micro-truss elements 12, 14, and 16 are configured to axially transfer a mechanical load applied to the micro-truss structure 10.

As described above, the micro-truss structure 10 withstands the mechanical load, e.g., via axial tension and compression of the micro-truss elements 12, 14, and 16. Molecular alignment of the micro-truss elements 12, 14, and 16 along their respective axial directions lends additional strength and/or stiffness to the micro-truss elements 12, 14, and 16 and, accordingly, also to the micro-truss structure 10.

The micro-truss elements 12, 14, and 16 may be configured to provide the micro-truss structure 10 with a stretch-dominated behavior under a compression load applied to the micro-truss structure 10. Such stretch-dominated behavior is contrasted from the bending-dominated behavior (e.g. of randomly oriented open-cell structures), as described in Ashby, "The Properties Of Foam And Lattices," Philosophical Transactions—Royal Society Of London Series A Mathematical Physical And Engineering Sciences, Vol. 364, 2006, which is incorporated by reference herein in its entirety.

In a bending-dominated structure, the elastic modulus is proportional to the square of the relative density $\rho'/\rho_s'$, where $\rho'$ is the density of the cellular material and $\rho_s'$ is the density of the solid from which it is constructed. In contrast, a stretch-dominated structure (such as micro-truss structure 10), has a compressive elastic modulus (E) directly proportional to both the relative density thereof and the modulus ($E_s$) of the solid material portion of the micro-truss structure 10, as expressed in equation (1) below:

$$E = E_s(\sin^4\theta)(\rho/\rho_s) \qquad (1)$$

where $\rho$ is a density of the micro-truss structure 10, $\rho_s$ is a density of a solid material portion of the micro-truss structure 10, $\theta$ is an angle of at least one of the micro-truss elements 12, 14, and 16 relative to a compression surface (e.g., a surface parallel to the xz-plane of FIGS. 1 and 2) of the micro-truss structure 10, and $E_s$ is a modulus of the solid material portion of the micro-truss structure 10. As such, the elastic modulus of the micro-truss structure is also proportional to a geometric function of the angle $\theta$ of the structure, and $\theta$ can accordingly be chosen to vary (e.g., increase or reduce) the elastic modulus.

Figure 7:
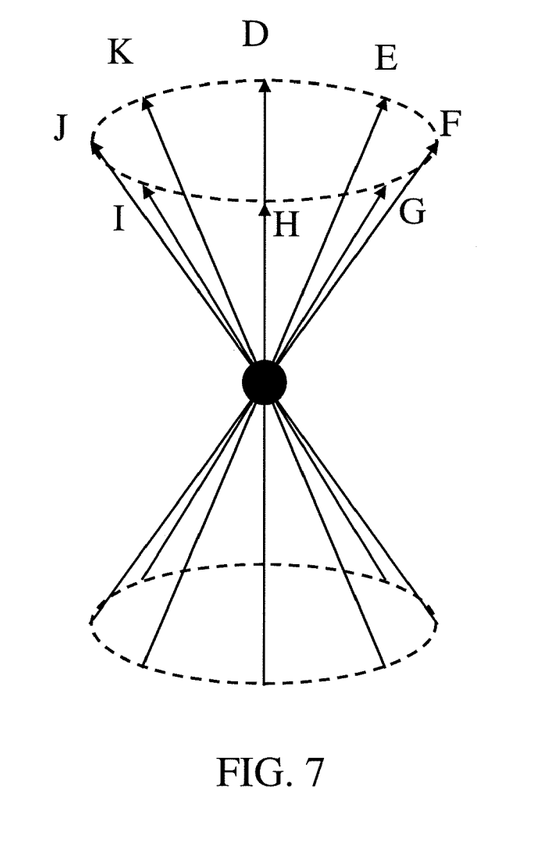
FIG. 7 is a perspective schematic view showing respective directions along which micro-truss elements of a structure extend, according to one embodiment of the present invention.

Referring back to FIGS. 1 and 2, the micro-truss structure 10 includes micro-truss elements 12, 14, and 16 respectively extending along A, B, and C directions. However, embodiments of the present invention are not limited to systems for and methods of manufacturing micro-truss structures. For example, with reference to FIG. 7, a micro-truss structure may include micro-truss elements defined by self-propagating polymer waveguides and extending along D, E, F, G, H, I, J and K directions, respectively. For example, a structure may include eight micro-truss elements, each of which extends along a corresponding one of eight directions. Here, similar to the structure shown in FIGS. 1 and 2, the eight micro-truss elements interpenetrate each other to form nodes of a continuous material with an ordered 3D micro-truss structure. However, the system may be configured to fabricate micro-truss structures that may include more or fewer than eight micro-truss elements.

An open volume of a cellular structure may be filled at least partially with a material different from the material of the cellular structure itself, thereby creating an ordered bi-phase composite. Also in another embodiment of the present invention, the system may be configured to coat one or more micro-truss elements of a cellular structure with a material different from the material of the cellular structure itself to adjust the thermal behavior thereof. Also in another embodiment of the present invention, the system may be configured to coat base elements of a cellular structure with a material different from the material of the cellular structure itself, and to remove the base elements to create a self-supporting structure having continuous but separated volumes.

One embodiment of the present invention is directed toward a system and method for manufacturing an ordered three dimensional micro-truss structure as described above. Here, the micro-truss members are initially fabricated from a polymer and can vary anywhere between about 1 and about 500 (or between 1 and 500) microns in diameter. The angle, diameter, spacing and geometric architecture of the micro-truss members can be suitably varied to create micro-truss structures with solid volume fractions between about 2% and about 90% (or between 2% and 90%).

In view of the foregoing, the 3D micro-truss structure can therefore be formed by a process that scales the fabrication of polymer micro-truss structured materials from bench-top scale to a large-scale, continuous or batch manufacturing process. The process results in higher-quality and more consistent micro-truss structures, as well as more efficient utilization of raw materials.

For example, the exposure of the photo-monomer from below as shown in FIG. 5 allows longer exposure time with less risk of overexposure. As a result, the polymer waveguides are stiffer and more fully cured, and the micro-truss structure is more self-supporting. The micro-truss can be removed from the mask 330 immediately after exposure, and once removed, the excess photo-monomer 320 drains out more quickly and evenly, and residual photo-monomer 320 on the micro-truss is removed more quickly, using less solvent.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A system for forming a plurality of polymer waveguides, the system comprising:
   at least one collimated light source for producing a plurality of collimated light beams;
   a channel with an exposure area for the collimated light beams to pass through and for containing a volume of photo-monomer adapted to polymerize when exposed to the collimated light beams, the photo-monomer moving with respect to the plurality of collimated light beams;
   a first squeegee like dam for defining a side of the volume of photo-monomer when in contact with a mask or a substrate onto which the photo-monomer is applied, wherein the first squeegee-like dam can be lifted or retracted to allow batch formation of the plurality of polymer waveguides; and the mask
   disposed between the at least one collimated light source and the channel, the mask extending along a plane and having at least one aperture adapted to guide a first beam, a second beam and a third beam of the collimated light beams into the photo-monomer to respectively form and grow a first polymer waveguide, a second polymer waveguide and a third polymer waveguide of the polymer waveguides in a portion of the photo-monomer,
   wherein the mask is configured to move with the photo-monomer and the polymer waveguides in a first direction across the exposure area, and the system is configured to continuously grow the plurality of polymer waveguides to form a micro-truss structure having a length in the first direction that is independent of a size of the exposure area.

2. The system of claim 1, wherein the at least one light source is fixed in size and has a fixed location.

3. The system of claim 1, further comprising a conveyer system configured to move the photo-monomer and the polymer waveguides across the exposure area.

4. The system of claim 3, wherein the conveyer system comprises the substrate configured to move the polymer waveguides.

5. The system of claim 4, wherein the substrate is substantially transparent to the collimated light beams and the mask is interposed between the substrate and the at least one collimated light source.

6. The system of claim 4, wherein the substrate is the mask.

7. The system of claim 3, wherein the conveyer system is further configured to move the mask.

8. The system of claim 3, wherein the conveyer system comprises a removal device, interposed between a path of the micro-truss structure and a path of the conveyer system and adapted to sever the micro-truss structure from a substrate of the conveyer system, the removal device comprising a plate having a sharp edge.

9. The system of claim 1, wherein the at least one collimated light source comprises a plurality of collimated light sources, wherein the at least one aperture comprises a plurality of apertures adapted to guide the collimated light beams to continuously form the plurality of polymer waveguides, wherein the plurality of polymer waveguides have an interconnected three-dimensional (3D) ordered polymer micro-truss structure.

10. The system of claim 9, wherein a spacing between each of the plurality of polymer waveguides in the interconnected ordered 3D polymer micro-truss structure corresponds to a pattern of the plurality of apertures.

11. The system of claim 1, wherein the channel comprises a reservoir.

12. The system of claim 1, wherein the mask is made of a flexible material having a thickness between 5 and 10 mil.

13. The system of claim 1, wherein the mask rests, without attachment, on the bottom surface of the channel.

14. The system of claim 1, wherein the mask is located above the channel.

15. The system of claim 1, wherein the mask is located on a side of the channel.

16. The system of claim 1, wherein the mask is a continuous loop.

17. The system of claim 1, further comprising a transparent film located between the bottom surface of the channel and the photo-monomer and configured to move with the mask.

18. The system of claim 1, further comprising a second dam configured to selectively contain the photo-monomer within the exposure area,
wherein the system is configured to form the micro-truss structure in batches in which the system is configured to lower the second dam to define a volume of photo-monomer and to raise the second dam after the plurality of polymer waveguides has grown.

19. The system of claim 1, wherein walls of the channel and a height of the dam are selected to accommodate a depth of photo-monomer sufficient to form a polymer waveguide structure having a thickness between ½ and 5 unit cells, each of the unit cells having corresponding unit cell waveguides interpenetrating at corresponding unit cell nodes, the separation between any two of the unit cell nodes being between 5 and 15 times the diameter of the corresponding one of the unit cell waveguide, and the diameter of each of the unit-cell waveguides being between 10 microns and 5 mm.

20. A system for forming a plurality of polymer waveguides, the system comprising:
at least one collimated light source for producing a plurality of collimated light beams;
a channel with an exposure area for the collimated light beams to pass through and for containing photo-monomer adapted to polymerize when exposed to the collimated light beams, the photo-monomer moving with respect to the plurality of collimated light beams;
a first squeegee-like dam for defining a side of the volume of photo-monomer when in contact with a digital mask or a substrate onto which the photo-monomer is applied, wherein the first squeegee-like dam can be lifted or retracted to allow batch formation of the plurality of polymer waveguides; and a digital display device disposed between the at least one collimated light source and the photo-monomer, the display device extending along a plane and being configured to display the mask, the mask having at least one aperture adapted to guide a first beam, a second beam and a third beam of the collimated light beams into the photo-monomer to respectively form and grow a first polymer waveguide, a second polymer waveguide and a third polymer waveguide of the polymer waveguides in a portion of the photo-monomer,
wherein the display device is configured to move the mask with the photo-monomer and the polymer waveguides in a first direction across the exposure area, and the system is configured to continuously grow the plurality of polymer waveguides to form a micro-truss structure having a length in the first direction that is independent of a size of the exposure area.

21. A method for forming an ordered 3D polymer micro-truss structure, the method comprising:
moving a mask and a photo-monomer composition coated thereon in a first direction across an exposure area of a channel, the exposure area being within a reservoir defined by the channel and by a first squeegee-like dam at one end by a dam, the first squeegee-like dam for defining a side of the volume of photo-monomer when in contact with the mask or a substrate onto which the photo-monomer is applied, wherein the first squeegee-like dam can be lifted or retracted to allow batch formation of the plurality of polymer waveguides; and;
exposing the photo-monomer to collimated light through the mask in the exposure area of the channel;
growing a plurality of polymer waveguides into the photo-monomer to form the micro-truss structure having a length in the first direction independent of a size of the exposure area; and
conveying the ordered 3D polymer micro-truss structure from the channel.

22. The method of claim 21, further comprising preparing the mask for another exposure after the ordered 3D polymer micro-truss structure is formed, and re-circulating the mask through the channel.

23. The method of claim 21, wherein excess photo-monomer from the ordered 3D polymer micro-truss structure is collected and recycled.

24. The method of claim 21, wherein the ordered 3D polymer micro-truss structure is cleaned by dissolving any residual photo-monomer with a solvent that does not affect the polymer.

25. The method of claim 21, wherein the thickness of the ordered 3D polymer micro-truss structure can be varied by varying the height of the photo-monomer in the channel.

26. The method of claim 21, wherein the ordered 3D polymer micro-truss structure is made by a batch process to form a sheet having a fixed width and a fixed length.

* * * * *